United States Patent [19]

Park et al.

[11] Patent Number: 5,475,035
[45] Date of Patent: Dec. 12, 1995

[54] PROCESS AND APPARATUS FOR MAKING A THERMOPLSTIC FOAM STRUCTURE EMPLOYING DOWNSTREAM INJECTION OF WATER

[75] Inventors: Chung P. Park, Pickeringoton; Gerald A. Garcia, Newark, both of Ohio

[73] Assignee: The Dow Chemical Company, Midland, Mich.

[21] Appl. No.: 321,366

[22] Filed: Oct. 11, 1994

[51] Int. Cl.[6] ........................................ C08J 9/00
[52] U.S. Cl. ................. 521/79; 264/45.9; 521/98
[58] Field of Search ................... 521/79, 98; 264/45.9

[56] References Cited

U.S. PATENT DOCUMENTS

| | | | |
|---|---|---|---|
| 4,344,710 | 8/1982 | Johnson et al. | 366/76 |
| 4,424,287 | 1/1984 | Johnson et al. | 521/74 |
| 4,436,679 | 3/1984 | Winstead | 264/40.3 |
| 4,455,272 | 6/1984 | Schubert et al. | 264/53 |

Primary Examiner—Morton Foelak
Attorney, Agent, or Firm—J. Robert Dean, Jr.

[57] ABSTRACT

Disclosed is a process for making a thermoplastic polymer foam structure with a blowing agent having water. The process comprises in sequence: a) melting the polymer to form a polymer melt; b) incorporating a brominated aliphatic fire retardant into the polymer melt; c) incorporating and mixing a first blowing agent into the polymer melt to form a first foamable gel; d) cooling the first foamable gel to a suitable foaming temperature; e) incorporating and mixing a second blowing agent comprising water into the cooled first foamable gel to form a second foamable gel; f) optionally further cooling the second foamable gel to a suitable foaming temperature; and g) extruding the second foamable gel through an extrusion die to form a foam structure. Incorporating of the water blowing agent downstream in the process after the foamable gel has been cooled reduces or minimizes process corrosion problems. Further disclosed is an apparatus for making the foam structure.

12 Claims, 2 Drawing Sheets

5,475,035

PROCESS AND APPARATUS FOR MAKING A THERMOPLSTIC FOAM STRUCTURE EMPLOYING DOWNSTREAM INJECTION OF WATER

BACKGROUND OF THE INVENTION

This invention relates to a process for making an extruded thermoplastic foam structure with a first blowing agent and a second blowing agent comprising water.

Because of environmental concerns, it is desirable to employ inorganic blowing agents such as carbon dioxide, nitrogen, and water in making thermoplastic polymer foam structures. Water has utility because of its relatively high blowing power and cooling capability.

A problem with using water as a blowing agent is that it may increase corrosion in process equipment. The problem is particularly acute when a brominated aliphatic fire retardant is employed. Water can combine with hydrogen bromide (HBr) or other decomposition products of brominated aliphatic fire retardants resulting in polymer melts and gels of polymer melts and blowing agents with relatively high acid content. The problem is particularly acute at process temperatures of about 160° C. or more, the range at which potentially troublesome levels of decomposition typically occur in commonly-employed brominated fire retardants.

One means of addressing the acid problem is to employ process surfaces and equipment comprised of acid-resistant alloys or materials. Employing such equipment is undesirable due to their considerable cost, which is typically much higher than non acid-resistant alloys and materials.

Another means of addressing the acid problem is to employ acid scavengers, i.e. compounds having a basic moiety, to neutralize the acid content of the polymer melt. Acid scavengers are commonly employed in making foams, but there are practical limits as to their effectiveness and how much may be employed. High levels of acid scavengers may interfere with the fire-retarding performance of the flame retardant as well as physical properties of the end product foam structure.

It would be desirable to minimize corrosion of process surfaces and equipment when making foams with water as a component of the blowing agent. It would further be desirable to accomplish this while minimizing equipment costs or adverse impact to the physical and flame-retardant properties of the end product foam structure.

SUMMARY OF THE INVENTION

According to the present invention, there is a process for making a thermoplastic polymer foam structure. The process comprises in sequence: a) melting a thermoplastic polymer material to form a polymer melt; b) incorporating and mixing a first blowing agent into the polymer melt to form a first foamable gel; c) cooling the first foamable gel to a suitable foaming temperature, preferably about 160° C. or less; d) incorporating and mixing a second blowing agent comprising water into the first foamable gel to form a second foamable gel; and e) extruding the second foamable gel through an extrusion die to form a foam structure. The first blowing agent will be a blowing agent substantially free of water. Incorporating the water downstream of the first blowing agent after the first foamable gel has been cooled die allows corrosion in process equipment to be minimized.

Further according to the present invention, there is an apparatus for making a thermoplastic polymer foam structure. The apparatus comprises in sequence: a) a means for melting the polymer material to form a polymer melt; b) a means for incorporating and mixing a first blowing agent into the polymer melt to form a foamable gel; c) a means for cooling the foamable gel to a suitable foaming temperature, preferably about 160° C. or less; d) a means for incorporating and mixing a second blowing agent comprising water into the foamable gel; and e) an extrusion die.

The above process and apparatus may be adapted to conventional extruder/mixer/cooler apparatus and processes or conventional tandem extrusion apparatuses and processes.

BRIEF DESCRIPTION OF THE DRAWINGS

The features of the present invention will be better understood upon viewing the drawings together with the remainder of the specification.

DETAILED DESCRIPTION

Figure 1:
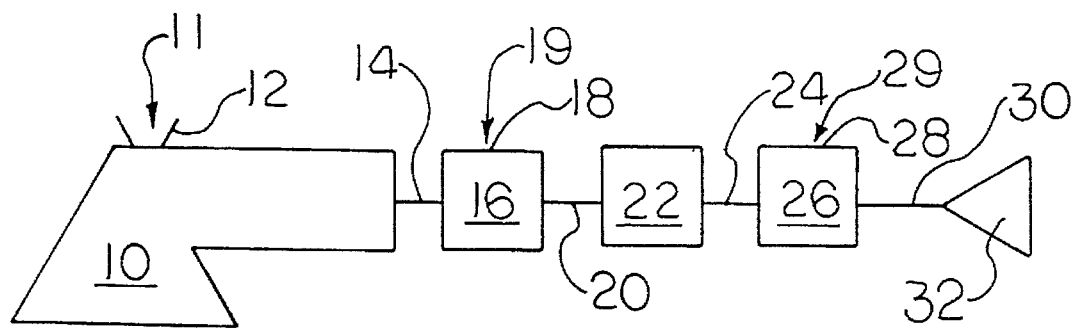
FIG. 1 shows a schematic representation of an embodiment of an extruder/mixer apparatus for carrying out the process of the present invention.

In the present invention, the corrosion problem is addressed by cooling the polymer melt or gel before introducing water into the melt or gel. Cooling substantially reduces the rate of corrosion of susceptible metal process surfaces by acid compounds formed in the polymer melt or gel by the combination of water and the acidic decomposition products of the brominated aliphatic fire retardant. Desirably, the polymer melt or gel is cooled to about 160° C. or less and preferably about 150° C. or less. At these temperature ranges, corrosion rates are substantially lower than at higher temperatures. Before cooling, typical processing temperatures are about 180° C. to about 240° C. Preferably, blowing agents other than water are introduced or incorporated into the polymer melt in that elevated temperature range because of better mixing conditions in that temperature range.

Corrosion can further be reduced or minimized by limiting the exposure of process surfaces and equipment to polymer melts or gels having acidic content. This can be accomplished by introducing the water into polymer melts or gels as close as possible to the die.

Thermoplastic polymer foam structures are generally prepared by heating a thermoplastic polymer material to form a plasticized or melt polymer material, incorporating therein a first blowing agent and a second blowing agent comprising water to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material to form a first foamable gel by any means known in the art such as with an extruder, mixer, blender, or the like. The blowing agent is mixed with the melt polymer material at an elevated pressure sufficient to prevent substantial expansion of the melt polymer material and to generally disperse the blowing agent homogeneously therein. Additives such as a nucleator or a fire retardant may be blended in the polymer melt or dry blended with the polymer material prior to plasticizing or melting. The first foamable gel is cooled to a lower temperature, i.e. about 160° C. or less or preferably 150° C. or less, in an extruder or other mixing device or in separate coolers. The first foamable gel is then conveyed or passed to a second mixing means such as an extruder or mixer to have incorporated therein a second blowing agent comprising water to form a second foamable gel. The second foamable gel may then, if necessary, be further cooled to a suitable or optimum foaming temperature simultaneously with or subsequent to the incorporation of the second blowing agent. The suitable foaming temperature depends on polymer properties. Suitable foaming temperatures typically range from about 100° C. to about 160° C. for alkenyl aromatic polymer foam structures and from about 60° C. to about 160° C. for polyolefin foam structures. The second foamable gel is then extruded or conveyed through a die of desired shape to a zone of reduced or lower pressure to form the foam structure. The zone of lower pressure is at a pressure lower than that in which the foamable gel is maintained prior to extrusion through the die. The lower pressure may be superatmospheric or subatmospheric (evacuated or vacuum), but is preferably at an atmospheric level.

One embodiment of the present invention is a conventional extruder/mixer process and apparatus as depicted in FIG. 1. The apparatus comprises in series an extruder 10, a first mixer 16, a cooler 22, a second mixer 26, and an extrusion die 32. Polymer material 11 and any additives are fed to extruder 10 through feed hopper 12. The polymer material is melted and extruded in extruder 10, and conveyed through a conduit means 14 to first mixer 16. A first blowing agent 19 is injected or added into mixer 16 through injection port 18. In mixer 16, the first blowing agent 19 is incorporated and mixed into the polymer melt to form a first foamable gel. The first foamable gel passes or is conveyed from mixer 16 through conduit means 20 to cooler 22. Cooler 22 lowers the temperature of the foamable gel to a temperature of about 160° C. or less and preferably to about 150° C. or less. The first foamable gel passes or is conveyed through conduit means 24 to second mixer 26. A second blowing agent 29 is injected or added into mixer 26 through injection port 28. In mixer 26, the second blowing agent 29 is incorporated and mixed into the first foamable gel to form a second foamable gel. The second foamable gel then passes or is conveyed through conduit means 30 to die 32. The second foamable gel passes through extrusion die 32 to a zone of reduced pressure to form the product foam structure. First and second mixers 16 and 24 may take the form of any dynamic mixer known in the art. Preferably, second mixer 26 takes the form of a cavity transfer mixer. Conduit means 14, 20, 24, and 30 may take any form of conduit known in the art for conveying polymer melts or liquids such as piping.

Figure 2:
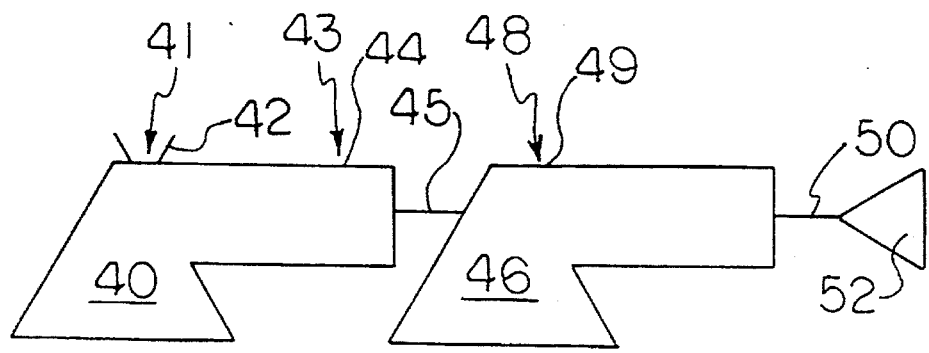
FIG. 2 shows a schematic representation of an embodiment of a tandem extrusion apparatus for carrying out the process of the present invention.

The present invention may take the form of an embodiment of a tandem extrusion apparatus or process as depicted in FIG. 2. The apparatus comprises in sequence a first extruder 40, a second extruder 46, and an extrusion die 52. Polymer material 41 and any additives may be fed to extruder 40 via hopper 42. Extruder 40 melts the polymer material and mixes it with any additives to form a polymer melt. A first blowing agent 43 is injected into the mixing section of extruder 40 through injection port 44. In extruder 40, the first blowing agent 43 is incorporated and mixed into the polymer melt to form a first foamable gel. The first foamable gel is passed or conveyed through conduit means 45 to second extruder 46. A second blowing agent 48 is injected or added into extruder 46 through injection port 49. In extruder 46, the first foamable gel is mixed with the second blowing agent 48 to form a second foamable gel, which is cooled to a lower temperature, preferably about 160° C. or less and more preferably about 150° C. or less. The second foamable gel may, if necessary, be further cooled to a suitable or optimum foaming temperature simultaneously with or subsequent to the mixing of the second blowing agent into the first foamable gel. The second foamable gel is passed or conveyed through conduit means 50 to extrusion die 52. The second foamable gel is passed or conveyed through extrusion die 52 to a zone of lower pressure to form the product foam structure. Conduit means 45 and 50 may take any form of conduit known in the art for conveying polymer melts or liquids such as piping.

Figure 3:
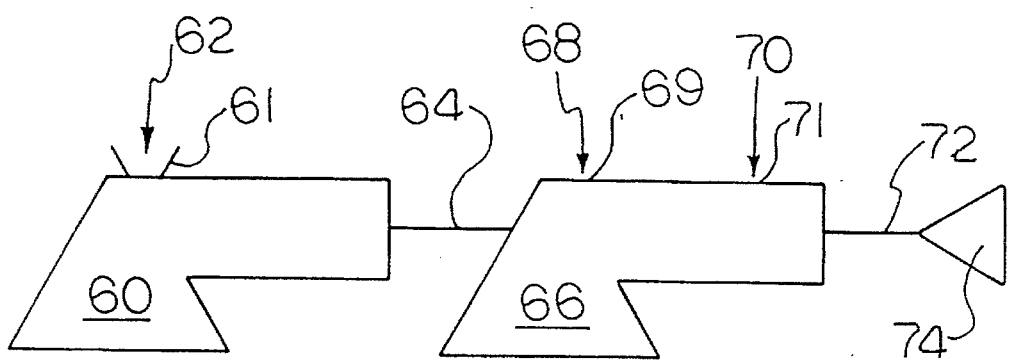
FIG. 3 shows a schematic representation of another embodiment of a tandem extrusion apparatus for carrying out the process of the present invention.

The present invention may take the form of another embodiment of a tandem extrusion apparatus or process as depicted in FIG. 3. The apparatus comprises a first extruder 60, a second extruder 66, and an extrusion die 74. Polymer material 62 and any additives may be fed to extruder 60 via hopper 61. Extruder 60 melts the polymer material and mixes it with any additives to form a polymer melt, which is passed or conveyed through conduit means 64 to second extruder 66. A first blowing agent 68 is injected into the mixing section of extruder 66 through injection port 69. The first blowing agent 68 is incorporated and mixed into the polymer melt to form a first foamable gel. The first foamable gel is cooled to a lower temperature, preferably 160° C. or less and more preferably about 150° C. or less, in the cooling section of extruder 66, and then passed or conveyed partly through extruder 66. The partially-cooled first foamable gel is then mixed with a second blowing agent 70 to form a second foamable gel, which is further cooled simultaneously during and/or after its mixing, and then passed or conveyed through conduit means 72 to die 74. The second blowing agent 70 is injected or added into extruder 66 through injection port 71 in the mixing section downstream of injection port 68. The second foamable gel is passed or conveyed through die 74 to a zone of lower pressure to form the product foam structure. Conduit means 64 and 72 may take any form of conduit known in the art for conveying polymer melts or liquids such as piping.

Figure 4:
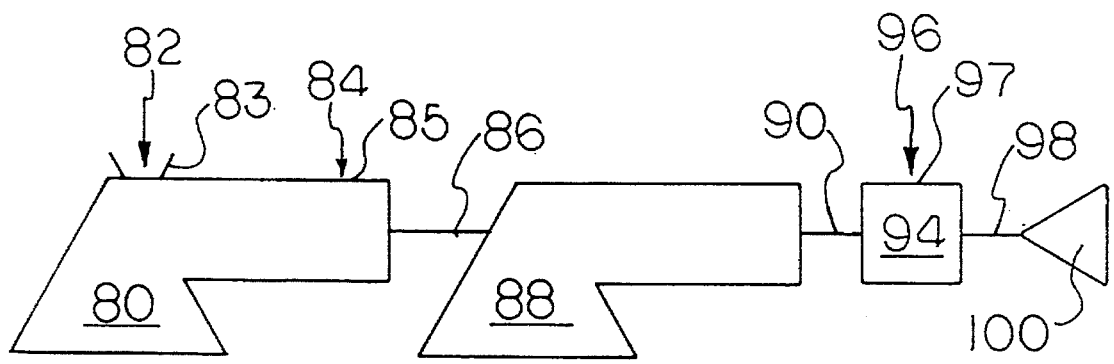
FIG. 4 shows a schematic representation of another embodiment of a tandem extrusion apparatus for carrying out the process of the present invention.

The present invention may take the form of a tandem extrusion/mixer apparatus or process as depicted in FIG. 4. The apparatus comprises in sequence a first extruder 80, a second extruder 88, a mixer 94, and an extrusion die 100. Polymer material 82 and any additives may be fed to extruder 80 via hopper 83. Extruder 80 melts the polymer material and mixes it any additives to form a polymer melt. A first blowing agent 84 is injected into the mixing section of extruder 80 through injection port 85. In extruder 80, the first blowing agent 84 is incorporated and mixed into the polymer melt to form a first foamable gel. The first foamable gel is passed or conveyed through conduit means 86 to second extruder 88. Additional mixing of the first foamable gel takes place in second extruder 88. The first foamable gel is passed or conveyed through conduit means 90 to mixer 94. Mixer 94 may take the form of any dynamic mixer known in the art. A preferred dynamic mixer is a cavity transfer mixer. A second blowing agent 96 is injected or added into mixer 94 through injection port 97. In mixer 94, the first foamable gel is mixed with the second blowing agent 96 to form a second foamable gel, and is cooled to a lower temperature, about 160° C. or less and preferably about 150° C. or less. Most preferably, the second foamable gel is further cooled to a suitable or optimum foaming temperature. If the temperature of the first foamable gel entering mixer 94 is too high or if shear heating takes place in mixer 94, further cooling is necessary. Further cooling may be carried out by cooling within the mixer or by another cooler downstream of the mixer. The second foamable gel is passed or conveyed through conduit means 98 to die 100. The second foamable gel is passed or conveyed through die 100 to a zone or lower pressure to form the product foam structure. Conduit means 86, 90, and 98 may take any form of conduit known in the art for conveying polymer melts or liquids such as piping.

Figure 5:
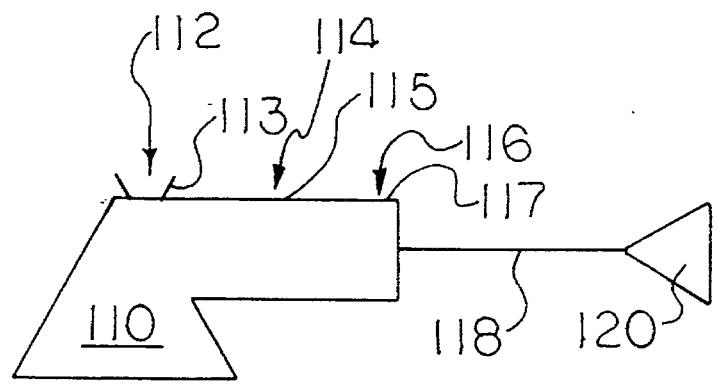
FIG. 5 shows a schematic representation of an embodiment of a single extruder apparatus for carrying out the process of the present invention.

The present invention may take the form of a single extruder apparatus or process as depicted in FIG. 5. The apparatus comprises in sequence an extruder 110 and an extrusion die 120. Polymer material 112 and any additives may be fed to extruder 110 via hopper 113. Extruder 110 melts the polymer material and mixes it with any additives to form a polymer melt. A first blowing agent 114 is injected into the mixing section of extruder 110 through injection port 115. The first blowing agent 114 is incorporated and mixed into the polymer melt to form a first foamable gel. The first foamable gel is then passed or conveyed partly through extruder 110. A second blowing agent 116 is injected or added into the later or downstream portion of the mixing section of extruder 110 through injection port 117, which is located where the gel is cooled to a lower temperature, preferably 160° C. or less and more preferably about 150° C. or less. In the remainder of extruder 110, the first foamable gel is mixed with the second blowing agent 116 to form a second foamable gel, and then further cooled, if necessary, to a suitable or optimum foaming temperature. The second foamable gel is passed or conveyed through conduit means 118 to die 120. The second foamable gel is passed or conveyed through extrusion die 120 to a zone of lower pressure to form the product foam structure. Conduit means 118 may take any form of conduit known in the art for conveying polymer melts or liquids such as piping.

Blowing agents useful as blowing agents in combination with water include inorganic blowing agents, organic blowing agents and chemical blowing agents. Suitable inorganic blowing agents include carbon dioxide, nitrogen, argon, air, nitrogen, and helium. Organic blowing agents include aliphatic hydrocarbons having 1–9 carbon atoms, aliphatic alcohols having 1–3 carbon atoms, and fully and partially halogenated aliphatic hydrocarbons having 1–4 carbon atoms. Aliphatic hydrocarbons include methane, ethane, propane, n-butane, isobutane, n-pentane, isopentane, neopentane, and the like. Aliphatic alcohols include methanol, ethanol, n-propanol, and isopropanol. Fully and partially halogenated aliphatic hydrocarbons include fluorocarbons, chlorocarbons, and chlorofluorocarbons. Examples of fluorocarbons include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorohexafluoropropane. Chemical blowing agents include azodicarbonamide, azodiisobutyro-nitrile, benzenesulfonhydrazide, 4,4-oxybenzene sulfonyl-semicarbazide, p-toluene sulfonyl semi-carbazide, barium azodicarboxylate, N,N'-dimethyl-N,N'-dinitrosoterephthalamide, and trihydrazino triazine. The terms "first blowing agent" and "second blowing agent" distinguish blowing agents injected upstream from those injected downstream.

The amount of blowing agent incorporated into the polymer melt material to make a foam-forming polymer gel is from about 0.2 to about 5.0 gram-moles per kilogram of polymer, preferably from about 0.5 to about 3.0 gram-moles per kilogram of polymer, and most preferably from about 1.0 to 2.50 gram-moles per kilogram of polymer.

Suitable thermoplastic polymer materials useful in making foam structures by the processes and apparatuses of the present invention may be selected from those which can be blown into a foam. Suitable polymer materials include polyolefins and alkenyl aromatic polymers. Suitable polyolefins include polyethylene, polypropylene, and ethylene and propylene copolymers thereof. Suitable polyethylenes include those of high, medium, low, linear low, and ultra low density type. Suitable alkenyl aromatic polymers include polystyrene and copolymers of styrene and other monomers.

A preferred present foam structure made by the processes and apparatuses of the present invention comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Regardless of composition, the alkenyl aromatic polymer material comprises greater than 50 and preferably greater than 70 weight percent alkenyl aromatic monomeric units derived from alkenyl aromatic compounds. Most preferably, the alkenyl aromatic polymer material is comprised entirely of alkenyl aromatic monomeric units.

Suitable alkenyl aromatic polymers include those derived from alkenyl aromatic compounds such as styrene, alpha-methylstyrene, ethylstyrene, vinyl benzene, vinyl toluene, chlorostyrene, and bromostyrene. A preferred alkenyl aromatic polymer is polystyrene.

Minor amounts of monoethylenically unsaturated compounds such as $C_{2-6}$ alkyl acids and esters, ionomeric derivatives, and $C_{4-6}$ dienes may be copolymerized with the alkenyl aromatic compounds or the olefin compounds ethylene and propylene. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and 1,3-butadiene.

Useful brominated fire retardants include any brominated aliphatic compounds heretofore employed as a flame retardant in foamed and non-foamed thermoplastic resins provided such compounds have at least one hydrogen atom attached to a carbon atom which is adjacent to a carbon atom containing at least one bromine atom. Representative brominated aliphatic compounds include, but are not limited to, hexabromocyclododecane; tris (2,3-dibromopropyl)phosphate; tetrabromo-vinylcyclohexane; tetrabromocyclooctane; pentabromo-chlorocyclohexane; 1,2-dibromo-methyl) cyclohexane; hexabromo-2-butene; and 1,1,1,3-tetrabromononane. Particularly preferred brominated aliphatic flame retardant compounds include hexabromocyclododecane and its isomers and pentabromocyclohexane and its isomers. Other suitable brominated fire retardant compounds include tribromodiphenyl ether, tetrabromodiphenyl ether, pentabromodiphenyl ether, hexabromodiphenyl ether, tribromochlorodiphenyl ether, tribromodichlorodiphenyl ether, trichlorodiphenyl ether, tetrabromodichlorodiphenyl ether, octobromodiphenyl ether, decabromodiphenyl ether, the 2-ethylhexyl, n-octyl, nonyl, butyl, dodecyl and 2,3-dioxypropyl ethers or tribromophenyl, tribromochlorophenyl, tribromodichlorophenyl, tetrabromobisphenol A, dioctyl ester of tetrabromophthalic acid. The fire retardant may comprise a mixture of one or more brominated fire retardants.

Thermoplastic foam structures may comprise one or more brominated aliphatic fire retardants at preferably between about 0.2 and about 10.0 weight percent elemental bromine and more preferably between about 0.6 and about 2.5 weight percent elemental bromine based upon the total weight of thermoplastic polymer material in the foam structure. The brominated aliphatic fire retardant may be dry-blended with the thermoplastic polymer material prior to melting and mixing or may be mixed with the polymer material during or after melting.

The foam structure may be cross-linked or non-crosslinked. The term non-crosslinked is inclusive of the slight degree of crosslinking which may occur naturally without the use of crosslinking agents or radiation. The foam structure is preferably non-crosslinked.

The foam structure has the density of from about 10 to about 150 kilograms per cubic meter and most preferably from about 10 to about 70 kilograms per cubic meter according to ASTM D-1622-88. The foam has an average cell size of from about 0.01 to about 5.0 and preferably from about 0.1 to about 1.5 millimeters according to ASTM D3576-77.

The foam structure may be closed cell or open cell. Preferably, the present foam is greater than 80 percent closed-cell according to ASTM D2856-A.

Various additives may be incorporated in the present foam structure such as inorganic fillers, pigments, antioxidants, acid scavengers, ultraviolet absorbers, processing aids, extrusion aids, and the like.

A nucleating agent may be employed to control cell size. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

The thermoplastic foam structures made by the processes and apparatuses of the present invention have a variety of uses, such as insulating foams and cushioning foams. Alkenyl aromatic polymer foams are particularly useful in insulating applications, and polyolefin foams are particularly useful in cushioning applications.

The following are examples of the present invention, and are not to be construed as limiting. Unless otherwise indicated, all percentages, parts, or proportions are by weight.

EXAMPLES

Example 1 and Corresponding Comparative/Control Examples

An alkenyl aromatic polymer foam structure made according to the process of the present invention was made with a first blowing agent of carbon dioxide and a second blowing agent of water wherein the water was injected separately and downstream from the carbon dioxide. A comparative foam structure was made by injecting both carbon dioxide and water upstream.

The apparatus employed comprised in series a 38 millimeter (mm) (1½ inch) screw-type extruder, a first mixer, a cooler, a second mixer, and a die having an adjustable die gap. The first and second mixers had openings for blowing agent injection therein. The extruder had sequential zones of feeding, melting, and metering. The first mixer was a dynamic mixer. The second mixer was a self-driven, cavity transfer mixer (CTM) with internal dimensions of approximately 6.35 centimeter (cm) in diameter and 30 cm in length.

A granular polystyrene having weight average molecular weight of about 180,000 according to size exclusion chromatography (SEC) was uniformly mixed with 0.1 parts per hundred (pph) hexabromocyclododecane (HBCD) flame retardant and 0.05 pph calcium stearate to form a dry blend.

The dry blend was fed to the extruder, where it was melted and pumped at a rate of 4.54 kgs/hr (10 lbs/hr) in Test 1.2 and about 3.63 kilograms per hour (kgs/hr) (8 pounds per hour (lbs/hr)) in all other tests. Carbon dioxide was injected into the first mixer at a predetermined rate to mix with the polymer melt to form a foamable gel at a rotor speed of 45 rpm. The foamable gel was cooled to below 140° C. in the cooler and passed to the CTM. The rotating speed of the CTM was 15 rpm in all tests.

In Test 1.1, water was injected into the CTM at a predetermined rate. A good-quality foam was produced at a CTM oil temperature of 137° C. and die gap of 0.71 mm. The pressure drop in the CTM was about 5.0 MPa, which was moderate. As shown in Table 1, the foam structure was of low density, homogeneous small cell size, low open cell content, and was substantially free of voids.

Tests 1.2 was conducted as a control example to Test 1.1. This test was performed under substantially the same procedure as Test 1.1.

In Control Test 1.2, water was injected into the first mixer together with carbon dioxide. At a CTM temperature of 137° C., a good foam structure having essentially the same quality as the one made in Test 1.1 was produced. Thus, foam structure quality was not sacrificed by employing downstream injection of water in Test 1.1.

This example shows the benefit of using water as a second blowing agent, and that water can be homogeneously mixed into a relatively low-temperature polymer/carbon dioxide gel in a downstream mixer. The shear encountered by the foamable gel in the CTM was moderate with a residence time of about 7 minutes.

TABLE 1

| Test No. | Carbon Dioxide Level[1] | Water Level[2] | Foam Density[4] | Cell Size[5] | Open Cell[6] | Quality[7] |
|---|---|---|---|---|---|---|
| 1.1 | 0.97 | 0.51 | 35 | 0.07 | 1 | G |
| 1.2* | 0.95 | 0.50 | 34 | 0.13 | 8 | G |

*Not an example of this invention
[1]Gram moles of carbon dioxide mixed in per one kilogram of polymer
[2]Gram moles of water mixed in per one kilogram of polymer
[3]Gap of the die opening in millimeters
[4]Density of foam body in kilograms per cubic meter
[5]Cell size in millimeters determined per ASTM D3576
[6]Open cell content in percentage determined per ASTM D2856-A
[7]Appearance of foam body: G = good quality with homogeneous cell size distribution Example 2

Alkenyl aromatic polymer foam structures made according to the process of the present invention were prepared at different CTM rotating speeds. The effect of CTM rotating speed on foam structure quality was ascertained using substantially the same apparatus and procedure of Example 1 except as indicated below.

Carbon dioxide was injected into the SPM at a uniform rate of 0.89 mpk or 3.92 pph. Water was injected into the CTM at 0.29 mpk (0.52 pph) rate. The gel was cooled in the cooler to about 148° C. The optimum CTM jacket oil temperature for good quality foam structures was determined to be 143° C. The rotating speed of the CTM rotor was varied from 10 to 25 rpm, and the die opening was slightly adjusted to produce a good quality foam structure at each mixer speed.

As shown in Table 2, good quality foam structures were produced at CTM rotating speeds of 15 rpm or higher. A foam structure of satisfactory quality was also produced at a CTM speed of 10 rpm. The foam structures had a slightly higher density than foam structures made at a higher CTM rpm. The tests indicate water can be uniformly mixed into polymer melt at a CTM speed as low as 10 rpm.

TABLE 2

| Test No. | CTM Speed[1] | Press Drop[2] | Foam Density[3] | Cell Size[4] | Open Cell[5] | Quality[6] |
|---|---|---|---|---|---|---|
| 2.1 | 10 | 6.6 | 40 | 0.27 | 2 | A |
| 2.2 | 15 | 6.2 | 38 | 0.27 | 7 | G |
| 2.3 | 20 | 5.3 | 37 | 0.16 | 14 | G |
| 2.4 | 25 | 5.7 | 38 | 0.16 | 16 | G |

[1]Rotating speed of the CTM in revolutions per minute
[2]Pressure drop across the CTM in megapascals
[3]Density of foam body in kilograms per cubic meter
[4]Cell size in millimeters determined per ASTM D3576
[5]Open cell content in percentage determined per ASTM D2856-A
[6]Appearance of foam body: G = good quality with homogeneous cell size distribution; A = acceptable or satisfactory quality Example 3

Alkenyl aromatic polymer foam structures were prepared as in Example 2 except a different blowing agent composition consisting of 0.86 mpk carbon dioxide and 0.79 mpk water was employed.

The foamable gel flowing from the cooler and entering the CTM was about 150° C. and the CTM jacket oil was maintained at about 144° C. The CTM rotating speed was varied from 5 to 35 rpm. The die opening was adjusted to provide a good foam at each CTM speed. To keep the die pressure above 8.1 MPa to prevent prefoaming, the die opening was gradually reduced from about 1.1 to 0.76 mm as CTM speed was raised.

As shown in Table 3, foam structures of good and satisfactory quality were achieved when CTM rotating speeds exceeded 5 rpm. The foam structures had low densities, adequate cell size, and a substantially closed cell structure.

The foam structure made at the CTM speed of 5 rpm was not satisfactory because of the presence of large voids (blow holes), which resulted from unmixed pockets of blowing agent.

The foam structure made at 35 rpm exhibited a relatively large open cell content indicating shear heating had reached a toleration threshold.

There may be an optimum shear rate for mixing. The optimum CTM rotating speed for the present apparatus and formulation appears to be 25 rpm, at which the best foam structure having the lowest density was achieved.

TABLE 3

| Test No. | CTM Speed[1] | Press Drop[2] | Foam Density[3] | Cell Size[4] | Open Cell[5] | Quality[6] |
|---|---|---|---|---|---|---|
| 3.1 | 5 | 7.6 | 41 | 0.30 | 0 | P |
| 3.2 | 10 | 6.3 | 34 | 0.27 | 0 | A |
| 3.3 | 15 | 5.5 | 32 | 0.27 | 1 | G |
| 3.4 | 20 | 5.3 | 32 | 0.23 | 2 | G |
| 3.5 | 25 | 5.0 | 30 | 0.23 | 0 | G |
| 3.6 | 30 | 5.0 | 31 | 0.30 | 0 | G |
| 3.7 | 35 | 4.9 | 32 | 0.18 | 24 | A |

*Not an exampie of this invention
[1]Rotating speed of the CTM in revolutions per minute (rpm)
[2]Pressure drop across the CTM in megapascals
[3]Density of foam body in kilograms per cubic meter
[4]Cell size in millimeters determined per ASTM D3576
[5]Open cell content in percentage determined per ASTM D2856-A
[6]6Appearance of foam body: G = good quality with homogeneous cell size distribution; P = poor quality with voids contained; A = acceptable or satisfactory quality Example 4

Alkenyl aromatic polymer foam structures were prepared as in Example 1 except blowing agent compositions having a fixed amount of water and varying amounts of carbon dioxide were employed. The water level was 1.0 mpk (or 1.8 pph), and the carbon dioxide level varied from 0.45 to 0.85 mpk.

One purpose was to show that a large-cell polystyrene foam suitable for floral and craft applications could be produced with a relatively high level of water and a relatively low level of carbon dioxide.

Foamable gel flowing from the cooler and into the CTM was at about 150° C., and the CTM jacket oil was maintained at about 148° C. The CTM rotating speed was 15 rpm. The die opening was adjusted to provide a good quality foam structure for each blowing agent composition. The die pressure was maintained above 7.1 MPa.

As shown in Table 4, a high level of water can be uniformly mixed in the polymer by the CTM thereby providing good quality foams having densities as low as 29 kgs/m³ and cell sizes as large as 2.0 mm. The foams are substantially free of open cells.

TABLE 4

| Test No. | Carbon Dioxide Level[1] | Water Level[2] | Die Gap[3] | Foam Density[4] | Cell Size[5] | Open Cell[6] | Quality[7] |
|---|---|---|---|---|---|---|---|
| 4.1 | 0.49 | 1.0 | 0.99 | 30 | 2.0 | 0 | G |
| 4.2 | 0.70 | 1.0 | 0.97 | 29 | 2.0 | 0 | G |
| 4.3 | 0.86 | 1.0 | 0.84 | 30 | 0.41 | 0 | G |

*Not an example of this invention
[1]Gram moles of carbon dioxide mixed in per one kilogram of polymer TABLE 4-continued

| Test No. | Carbon Dioxide Level[1] | Water Level[2] | Die Gap[3] | Foam Density[4] | Cell Size[5] | Open Cell[6] | Quality[7] |
| --- | --- | --- | --- | --- | --- | --- | --- |

[2] Gram moles of water mixed in per one kilogtam of polymer
[3] Gap of the die opening in millimeters
[4] Density of foam body in kilograms per cubic meter
[5] Cell size in millimeters determined per ASTM D3576
[6] Open cell content in percentage determined per ASTM D2856-A
[7] Appearance of foam body: G = good quality with homogeneous cell size distribution Example 5

Thermoplastic foam structures were made by conventional extrusion and a pseudo-accumulating extrusion using an ethylene/propylene copolymer.

The apparatus employed comprised a 25 mm (1 inch) screw-type extruder, a first mixer, a cooler, a second mixer, and a gap-adjustable die. The first mixer was a dynamic mixer. The second mixer was a cavity transfer mixer (CTM). The units have substantially the same configurations as those employed in Example 1 except for the extruder.

A granular 3/97 (percent by weight) ethylene/propylene random copolymer resin having 1.5 melt flow rate (per ASTM D1238 Condition L) was uniformly blended with antioxidants, 0.1 pph each of Irganox 1010 by Ciba-Geigy Corp. and Ultranox 626 by General Electric Co.

The blend was fed to the extruder at a uniform rate of 1.8 kgs/hr (4 lbs/hr). The temperatures of the extruder zones were 155° C., 195° C., and 220° C. at feeding, melting, and metering zones, respectively.

Carbon dioxide was injected at a 1.5 mpk rate into the first mixer, which was maintained at 235° C. and rotated at 38 rpm. The polymer/carbon dioxide gel was cooled to about 141° C. in the cooler, and then fed into the CTM. Water was injected at 0.63 mpk (1.1 pph) into the CTM, which was maintained at 140° C. and being rotated at 15 rpm.

A good quality foam structure having 43 kgs/m$^3$ density, 0.1 mm cell size, and 29 percent open cells was obtained at a die gap of 0.3 mm. The foam was dimensionally stable but of a relatively small cross-sectional size (0.17 cm$^2$). A foam structure of the larger cross-sectional size can usually be achieved at a higher extrusion rate. To demonstrate this, a pseudo-accumulating scheme was further employed.

The pseudo-accumulating scheme was as follows. After a sample was taken a steady extrusion condition in the above apparatus, the die orifice was closed to accumulate the foamable gel in the extrusion line until the die pressure increased by about 3.5 MPa (500 psi). The die was then quickly opened to about 0.5 mm so the accumulated gel would extrude out of the die orifice and expand. Indeed, a good quality foam structure of 0.36 cm$^2$ cross-sectional size, 34 kgs/m$^3$ density, 0.1 mm cell size, and 56 percent open cells was produced. The instantaneous extrusion rate was determined to about 5.6 kgs/hr.

While embodiments of the process and the apparatus of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A process for making a thermoplastic polymer foam structure, comprising:

a) melting a thermoplastic polymer material to form a polymer melt;

b) incorporating a brominated aliphatic fire retardant into the polymer melt;

c) incorporating and mixing a first blowing agent into the polymer melt to form a first foamable gel;

d) cooling the first foamable gel to a temperature of about 160° C. or less;

e) incorporating and mixing a second blowing agent comprising water into the cooled first foamable gel to form a second foamable gel;

f) optionally further cooling the second foamable gel to a suitable foaming temperature; and g) extruding the second foamable gel through a die to form the foam structure.

2. The process of claim 1, wherein the brominated aliphatic fire retardant is hexabromocyclododecane.

3. The process of claim 1, wherein the thermoplastic polymer is polystyrene.

4. The process of claim 1, wherein the thermoplastic polymer is polypropylene.

5. The process of claim 1, wherein the polymer material is melted by passing it through an extruder.

6. The process of claim 1, wherein the first blowing agent is incorporated and mixed into the polymer melt by passing the polymer melt through a first mixer while the first blowing agent is injected into the first mixer.

7. The process of claim 1, wherein the second blowing agent is incorporated and mixed into the first foamable gel by passing the first foamable gel through a second mixer while the second blowing agent is injected into the second mixer.

8. The process of claim 1, wherein the first blowing agent comprises carbon dioxide.

9. The process of claim 1, wherein the first foamable gel is cooled to a temperature of about 150° C. or less.

10. The process of claim 1, wherein the second blowing agent is incorporated and mixed into the first foamable gel by passing the first foamable gel through an extruder while the second blowing agent is injected into the extruder.

11. The process of claim 1, wherein the polymer material is melted by passing it through an extruder, the first blowing agent being incorporated and mixed into the polymer melt by passing the polymer melt through a first mixer while the first blowing agent is injected into the first mixer, the first foamable gel being cooled to a temperature of about 160° C. or less, the second blowing agent being incorporated and mixed into the first foamable gel by passing the first foamable gel through a second mixer while the second blowing agent is injected into the second mixer, the thermoplastic polymer material comprising polystyrene.

12. The process of claim 1, wherein the polymer material is melted by passing it through a first extruder, the first blowing agent being incorporated and mixed into the polymer melt by passing the polymer melt through the first extruder while the first blowing agent is injected into the first extruder, the first foamable gel being cooled to a temperature of about 160° C. or less, the second blowing agent being incorporated and mixed into the first foamable gel by passing the first foamable gel through a second extruder while the second blowing agent is injected into the second extruder, the thermoplastic polymer material comprising polystyrene.

* * * * *